US006189211B1

(12) United States Patent
Suter

(10) Patent No.: US 6,189,211 B1
(45) Date of Patent: Feb. 20, 2001

(54) METHOD AND ARRANGEMENT FOR CARRYING OUT REPAIR AND/OR MAINTENANCE WORK IN THE INNER CASING OF A MULTISHELL TURBOMACHINE

(75) Inventor: Roger Suter, Zürich (CH)

(73) Assignee: Asea Brown Boveri AG, Baden (CH)

(*) Notice: Under 35 U.S.C. 154(b), the term of this patent shall be extended for 0 days.

(21) Appl. No.: 09/307,735

(22) Filed: May 10, 1999

(30) Foreign Application Priority Data

May 15, 1998 (DE) ........................................ 198 21 889

(51) Int. Cl.[7] ........................................ B23P 15/00
(52) U.S. Cl. ........................................ 29/889.1; 29/402.04
(58) Field of Search ........................................ 29/889.1, 402.01, 29/402.03, 402.04

(56) References Cited

U.S. PATENT DOCUMENTS

| | | | | |
|---|---|---|---|---|
| 4,802,821 | | 2/1989 | Kreitmeier | 415/210 |
| 4,805,282 | * | 2/1989 | Reaves et al. | 29/889.1 |
| 5,575,145 | * | 11/1996 | O'Neill et al. | 29/889.1 |
| 5,870,824 | * | 2/1999 | Lilja et al. | 29/889.1 |

FOREIGN PATENT DOCUMENTS

| | | | | |
|---|---|---|---|---|
| 683970 | | 11/1939 | (DE) . | |
| 1166110 | | 3/1964 | (DE) . | |
| 0321809B1 | | 5/1991 | (EP) . | |
| 2202588 | | 9/1988 | (GB) . | |
| 802566 | * | 2/1981 | (SU) | 29/889.1 |

OTHER PUBLICATIONS

"Die Gastrubine GT13E2—ein richtungweisendes Konzept fur die Zukunft", Viereck, ABB Technik Jun. 7, 1993, pp. 11–16.

* cited by examiner

*Primary Examiner*—Irene Cuda Rosenbaum
(74) *Attorney, Agent, or Firm*—Burns, Doane, Swecker & Mathis, L.L.P.

(57) ABSTRACT

A relatively simple, effort-saving and cost-saving arrangement and a corresponding method for repair and/or maintenance work in the inner casing of a multishell turbomachine is provided. To this end, after a tool carrier is put into the outer casing of a turbinemachine, the connecting elements of top part and bottom part of the inner casing are slackened. The top part of the inner casing is then lifted in the outer casing to such an extent that the tool carrier can reach into the inner casing. To this end, at least one locating fixture for a lifting device is arranged on the top part. A radial distance is formed between the at least one outer casing and the inner casing, the radial distance corresponding to at least the radial extent of a tool carrier to be introduced into the inner casing.

9 Claims, 2 Drawing Sheets

Figur 1

METHOD AND ARRANGEMENT FOR CARRYING OUT REPAIR AND/OR MAINTENANCE WORK IN THE INNER CASING OF A MULTISHELL TURBOMACHINE

BACKGROUND OF THE INVENTION

1. Field of the Invention

The invention relates to a method and an arrangement for carrying out repair and/or maintenance work in the inner casing of a multishell turbomachine.

2. Discussion of Background

Depending on the pressure and temperature ratios to be expected, turbomachines are provided with single-shell or multishell casings. The requisite wall thickness of single-shell outer casings, in view of the thermal stresses, in particular at high pressures and temperatures, becomes relatively large. By the use of multishell casings, the effective pressure differences can be reduced and thus the wall and flange thicknesses can be reduced accordingly. In such multishell turbomachines, the inner casing carrying the blading is supported by the outer casing. In gas-turbine plants, such an inner casing may also accommodate the combustion chamber. As a result, the access required during repair and/or maintenance work to the various components arranged in the interior of the combustion chamber, such as, for example, the heat shields, the burners and their mountings, is not possible until after the opening of the outer casing and the subsequent opening of the combustion-chamber casing.

To avoid such time-consuming and costly measures in connection with the requisite repair and/or maintenance work, it is known to provide both the outer casing and the combustion-chamber casing of a gas-turbine plant with so-called manholes (see the article "Die Gasturbine GT13E2 ein richtungsweisendes Konzept für die Zukunft" in ABB Technik Jun. 7, 1993, pages 11–16, FIG. 3). Through these manholes, either a fitter can get into the combustion chamber or another appropriately equipped tool carrier can be introduced. Of course, there must be sufficient space in the interior of the combustion chamber for this purpose, which is not always guaranteed. In addition, some extra design and constructional work is required in order to make a manhole in the combustion chamber in a functionally reliable manner, which results in at least increased total costs.

SUMMARY OF THE INVENTION

Accordingly, one object of the invention, in attempting to avoid all of these disadvantages, is to provide for multishell turbomachines a relatively simple, effort-saving and cost-saving arrangement and a corresponding method for carrying out repair and/or maintenance work in the inner casing of a multishell turbomachine.

According to the invention, this is achieved in in that, after a tool carrier is put into the outer casing of a turbomachine, the connecting elements of top part and bottom part of the inner casing are slackened. Finally, the top part of the inner casing is lifted in the outer casing to such an extent that the tool carrier can reach into the inner casing. To this end, at least one locating fixture for a lifting device is arranged on the top part of the inner casing. A radial distance is formed between the at least one outer casing and the inner casing, the radial distance corresponding to at least the radial extent of a tool carrier to be introduced into the inner casing.

Compared with multishell turbomachines whose outer and inner casings have to be opened during repair and/or maintenance work, the advantages of the invention lie in a considerable time saving, since now only the inner casing is opened. Removing the outer casing is no longer necessary for such work. Compared with turbomachines whose inner casing is inaccessible for maintenance work and which therefore also necessitate removal of the outer casing or which have manholes both in the outer casing and in the inner casing, which is possibly provided with a cooled lining, a marked cost reduction is achieved. In addition, access to the components of the turbine may advantageously also be gained through the combustion-chamber casing when required.

It is especially expedient if the locating fixture for the lifting device acts on the geodetically highest casing part of the inner-casing top part or on either side of this casing part. To this end, the at least one outer casing is provided with at least one aperture, in alignment with the locating fixture, for an actuating element connected to the lifting device. Alternatively, the locating fixture for the lifting device is fastened to the top part in the region of the parting plane of the inner casing or is arranged there at least on one side. In both cases, during repair and/or maintenance work, in addition to the appropriately equipped tool carrier, the lifting device is also introduced from outside through the at least one outer casing and fastened to the top part of the inner casing.

In an especially advantageous manner, the lifting device is firmly installed on the top part of the inner casing and therefore remains permanently in the interior of the outer casing once it has been fitted. Thus more time can be saved, since the lifting device no longer has to be introduced into the outer casing and fastened to the inner casing during repair and/or maintenance work.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of a gas-turbine plant, wherein.

Only the elements essential for the understanding of the invention are shown. Elements of the plant which are not shown are, for example, the shaft of the gas-turbine plant as well as the feed and discharge lines for the working media used.

DESCRIPTION OF THE PREFERRED EMBODIMENTS

Figure 1:
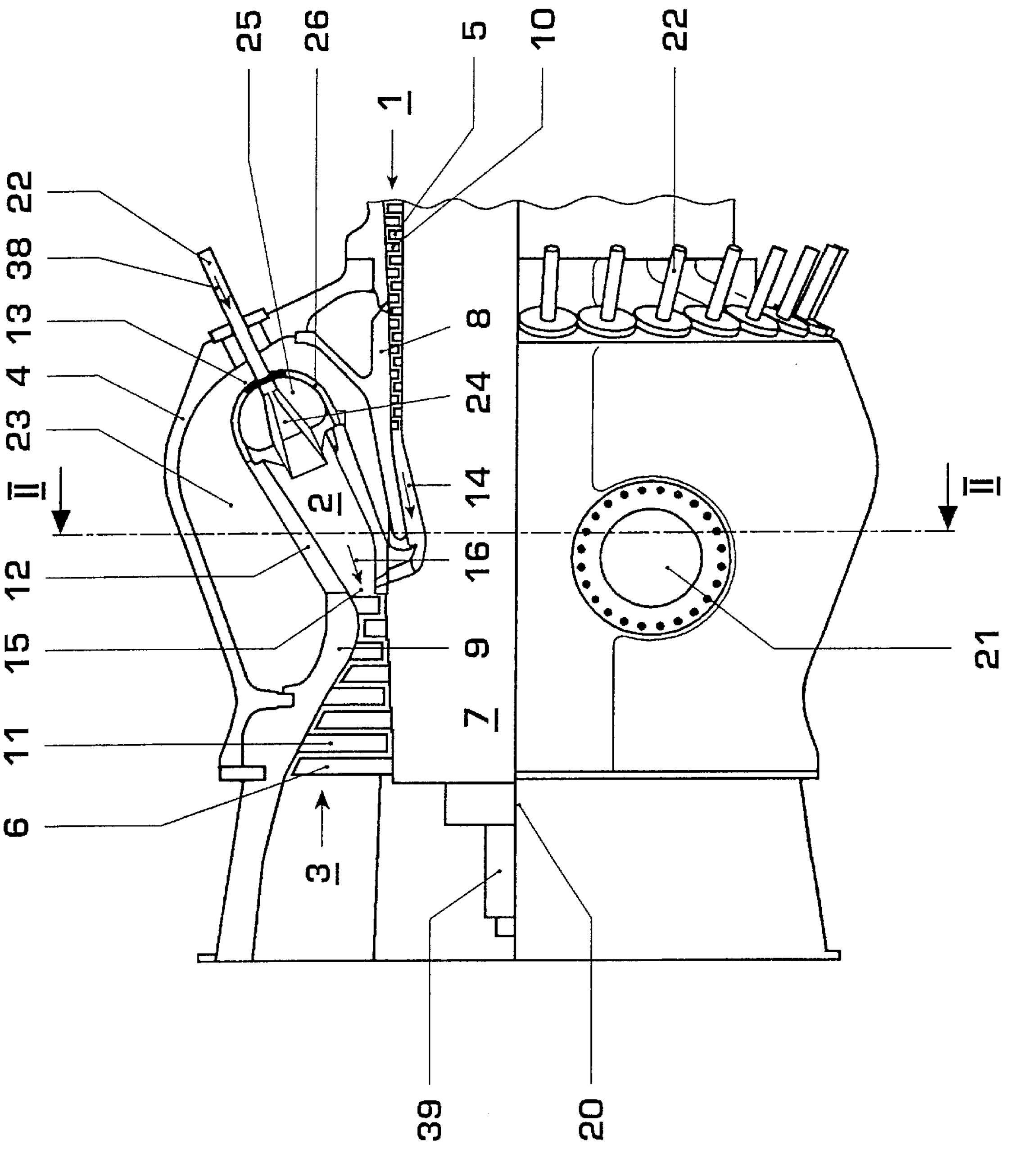
FIG. 1 shows a detail of a gas-turbine plant in side view, the top half being sectioned longitudinally and also being shown in a substantially simplified form.

Referring now to the drawings, wherein like reference numerals designate identical or corresponding parts throughout the several views, the gas-turbine plant essentially comprises a compressor 1, an annular combustion chamber 2 and a turbine 3, which are enclosed by a common outer casing 4. Both the compressor 1 and the turbine 3 are provided with a multiplicity of compressor or turbine moving blades 5, 6, which are arranged on a common rotor 7. In addition, in each case a blade carrier 8, 9 for a corresponding number of compressor and turbine guide blades 10, 11 respectively, which interact with the compressor and turbine moving blades 5, 6 respectively, is fastened to the outer casing 4 (FIG. 1).

Figure 2:
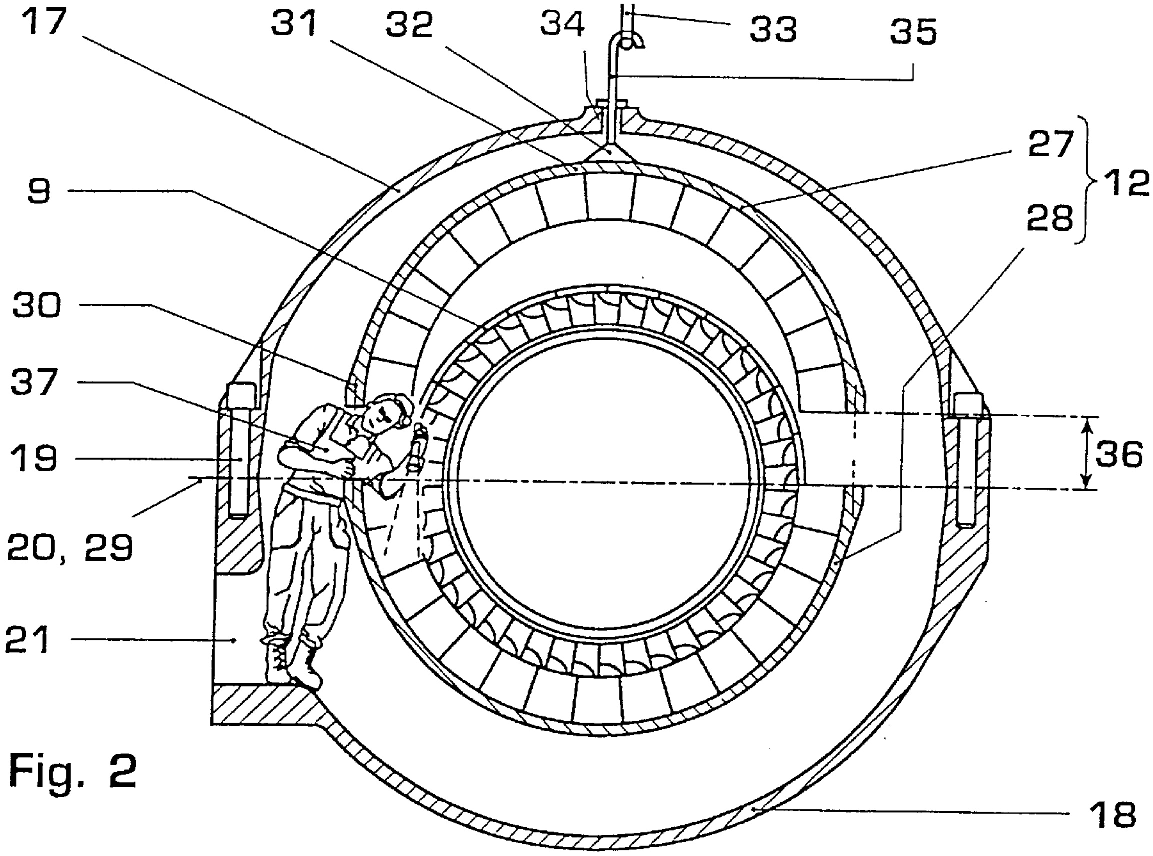
FIG. 2 shows a section through the gas-turbine plant along line II—II in FIG. 1 but with open combustion-chamber casing and with a first lifting device.

The annular combustion chamber 2, which is arranged in the direction of flow between the compressor 1 and the turbine 3, has a separate inner casing 12 designed as combustion-chamber casing. A first flow path 13 for air 14 compressed in the compressor 1 and a second flow path 15 for hot gases 16 formed in the annular combustion chamber 2 remain open in the combustion-chamber casing 12. The outer casing 4 of the gas-turbine plant consists of a top part 17 and a bottom part 18, which are connected to one another in a parting plane 20 by means of connecting elements 19 designed as screws (FIG. 2). In addition, the outer casing 4 is provided with a closable installation aperture 21 designed as a manhole. Numerous fuel lances 22 serving the fuel feed are arranged so as to pass through both the outer casing 4 and the combustion-chamber casing 12 and are appropriately connected to both. In the region of the annular combustion chamber 2, a combustion-chamber plenum 23, through which the fuel lances 22 also pass, is formed between the outer casing 4 and the combustion-chamber casing 12. The fuel lances 22 are each connected to a premix burner 24 leading into the annular combustion chamber 2 (FIG. 1). In this case, the premix burners 24 are designed as double-cone burners, as already disclosed by EP 0 321 809 B1. Other suitable premix burners may of course also be used. Each double-cone burner 24 has a burner dome 26, which delimits the combustion-chamber plenum 23 from a burner plenum 25.

Like the outer casing 4, the combustion-chamber casing 12 also consists of a top part 27 and a bottom part 28, which are connected to one another in a parting plane 29 via connecting elements 30 designed as screws. In this case, the parting plane 20 of the outer casing 4 and the parting plane 29 of the combustion-chamber casing 12 coincide (FIG. 2).

In a first exemplary embodiment, a locating fixture 32 for a lifting device 33 designed as hoisting gear is arranged on the top part 27 of the combustion-chamber casing 12, more precisely on its geodetically highest casing part 31. In addition, the outer casing 4 has a closable aperture 34, in alignment with the locating fixture 32, for an actuating element 35 connected to the lifting device 33. The combustion-chamber casing 12 has a radial distance 36, which corresponds to at least the radial extent of a tool carrier 37 to be introduced into the combustion-chamber casing 12. In this case, a device, machine and even a person may be used as the tool carrier 37.

During operation of the gas-turbine plant, ambient air is drawn in by means of the compressor 1 and is introduced in the form of compressed air 14 into the double-cone burners 24 and the annular combustion chamber 2 via the combustion-chamber plenum 23, the first flow path 13 and the burner plenum 25. Together with the fuel 38 fed via the fuel lances 22, it forms a fuel mixture, which is burned in the annular combustion chamber 2 to form hot gas 16. The latter passes via the second flow path 15 to the turbine 3 and is expanded in the latter, i.e. essentially in the turbine moving blades 6. In the process, the thermal energy inherent in the hot gas 16 is converted into kinetic energy, which drives the turbine moving blades 6 and thus the rotor 7. Since the latter also carries the compressor moving blades 5, the compressor 1 is driven at the same time. In addition, the shaft 39 carrying the rotor 5 is connected to a generator (not shown) in order to generate electricity. Of course, another or a further suitable power consumer may also be allocated.

If repair and/or maintenance work is to be carried out in the combustion-chamber casing 12, the tool carrier 37 equipped with appropriate tools is first of all put into the outer casing 4 of the gas-turbine plant via the open manhole 21. The closable aperture 34 is then opened, the actuating element 35 of the lifting device 33 is inserted through the aperture 34 into the interior of the outer casing 4, and the actuating element 35 is connected to the locating fixture 32 attached to the top part 27 of the combustion-chamber casing 12. After that, the screws 30 between the top part 27 and the bottom part 28 of the combustion-chamber casing 12 are slackened. Finally, the top part 27 in the outer casing 4 is lifted by means of the lifting device 33 to such an extent that the tool carrier 37 can reach into the combustion-chamber casing 12. Starting from the combustion-chamber casing 12, access to the adjacent components of the turbine 3 may also be advantageously gained when required. After the requisite work has been completed, the gas-turbine plant is closed again, the sequences described being carried out in the opposite order for this purpose.

Figure 3:
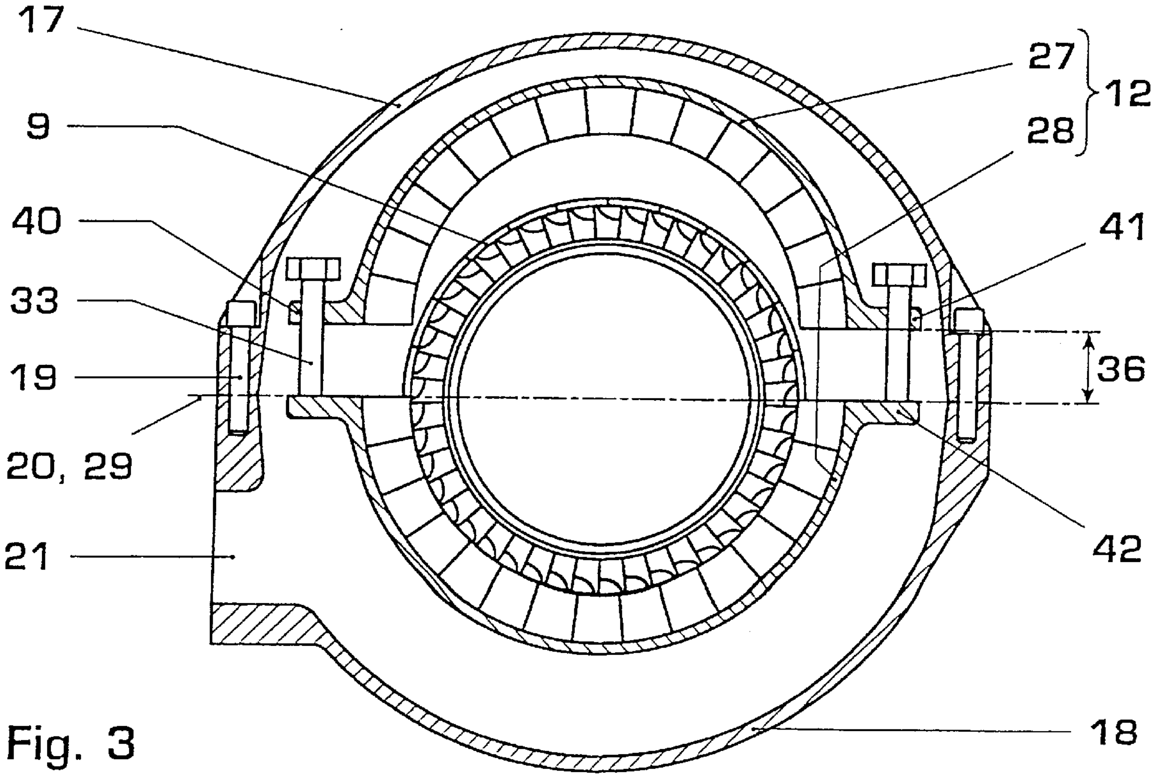
FIG. 3 shows the gas-turbine plant in a representation corresponding to FIG. 2 but further simplified compared with FIG. 2, with closed combustion-chamber casing and a second lifting device.

In a second exemplary embodiment of the invention, a lifting device 33 is arranged in each case on either side of the combustion-chamber casing 12. Both lifting devices 33 are designed as forcing screws. They are each guided in a corresponding tapped hole 40 of a first flange 41 fastened on either side of the combustion-chamber casing 12 to the top part 27 of the latter, the flanges 41 being arranged in the region of the parting plane 29 of top part 27 and bottom part 28 of the combustion-chamber casing 12. Provided on either side of the combustion-chamber casing 12 on its bottom part 28 is in each case a second flange 42, against which the forcing screws 33 act (FIG. 3). A single forcing screw 33 is of course also sufficient for certain applications, in which case this forcing screw 33 is arranged on that side of the combustion-chamber casing 12 which faces the manhole (not shown).

Unlike the first exemplary embodiment, a further aperture 34 in the outer casing 4 is unnecessary here, since both the tool carrier 37 and the forcing screws 33 can be introduced via the manhole 21. The combustion-chamber casing 12 is opened in essentially the same way as in the first exemplary embodiment; however, both forcing screws 33 must be adjusted in a corresponding manner in order to lift the top part. In an especially advantageous manner, however, the forcing screws 33, once installed, may remain permanently on the top part 27 of the combustion-chamber casing 12, i.e. only the tool carrier 37 has to be introduced during repair and/or maintenance work.

The invention may of course also be used in other multishell turbomachines or in other inner casings. For example, the inner casing to be opened may also be that casing of a turbomachine which carries the guide blades of a turbine or a compressor.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of carrying out repair and/or maintenance work in the inner casing of a multishell turbomachine, which in addition to the inner casing has at least one outer casing, the inner casing consisting of a top part and a bottom part connected to one another via connecting elements, in which method:

a) placing a tool carrier equipped with appropriate tools into the at least one outer casing via at least one closable installation aperture of said outer casing;

b) slackening the connecting elements of the top part and the bottom part; and c) lifting the top part of the inner casing in the outer casing to such an extent that the tool carrier can reach into the inner casing.

2. The method as claimed in claim 1, further including the step of:

introducing a lifting device from outside through the at least one outer casing and fastening the lifting device to the top part of the inner casing.

3. The method as claimed in claim 2, wherein the lifting device, once installed, remains permanently on the top part of the inner casing.

4. An arrangement for carrying out repair and/or maintenance work in the inner casing of a multishell turbomachine, which in addition to the inner casing has at least one outer casing provided with a closable installation aperture, the inner casing consisting of a top part and a bottom part connected to one another via connecting elements, wherein at least one locating fixture for a lifting device is arranged on the top part, and a radial distance is formed between the at least one outer casing and the inner casing, the radial distance corresponding to at least the radial extent of a tool carrier to be introduced into the inner casing.

5. The arrangement as claimed in claim 4, wherein the top part of the inner casing has a geodetically highest casing part, the locating fixture for the lifting device being arranged on this casing part or on either side of the latter, and the at least one outer casing being provided with at least one aperture, in alignment with the locating fixture, for an actuating element connected to the lifting device.

6. The arrangement as claimed in claim 4, wherein a parting plane is formed between the top part and the bottom part of the inner casing, and the locating fixture for the lifting device is fastened to the top part of the inner casing in the region of the parting plane of the latter.

7. The arrangement as claimed in claim 6, wherein the lifting device is arranged at least on one side on the top part of the inner casing.

8. The arrangement as claimed in claim 6, wherein the lifting device is firmly installed on the top part of the inner casing.

9. The arrangement as claimed in claim 4, wherein the multishell turbomachine is a gas-turbine plant, the outer casing is the outer casing of the gas-turbine plant, and the inner casing is the combustion-chamber casing of the gas-turbine plant.

* * * * *